March 31, 1970     L. E. SANDER     3,503,293
SLITTER CUTTING DISK ASSEMBLY TRANSFER DEVICE
Filed March 11, 1968     3 Sheets-Sheet 1
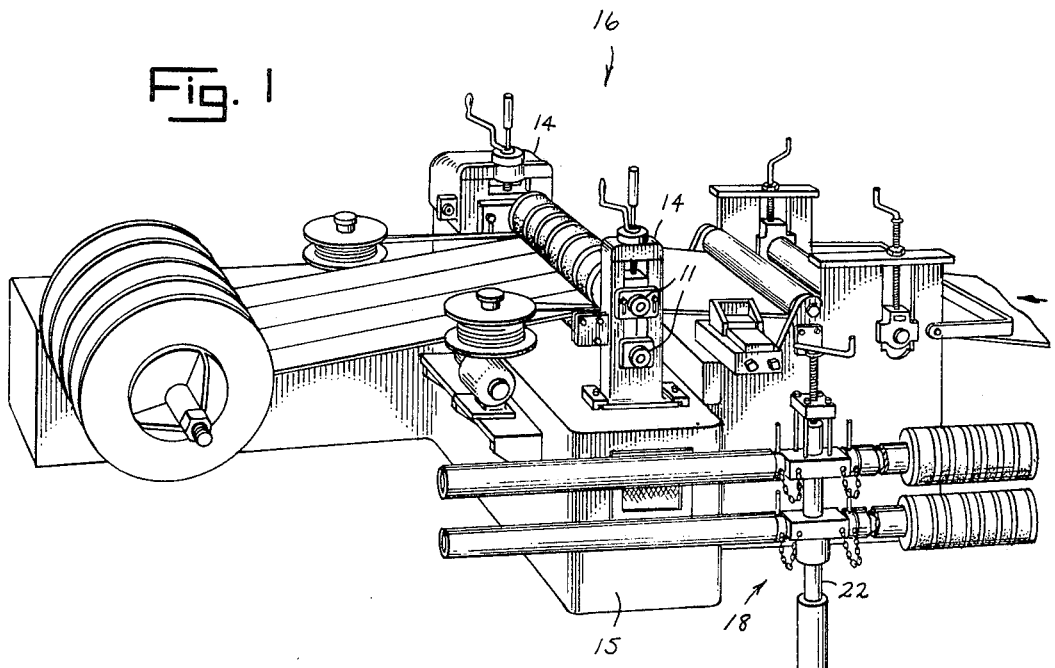
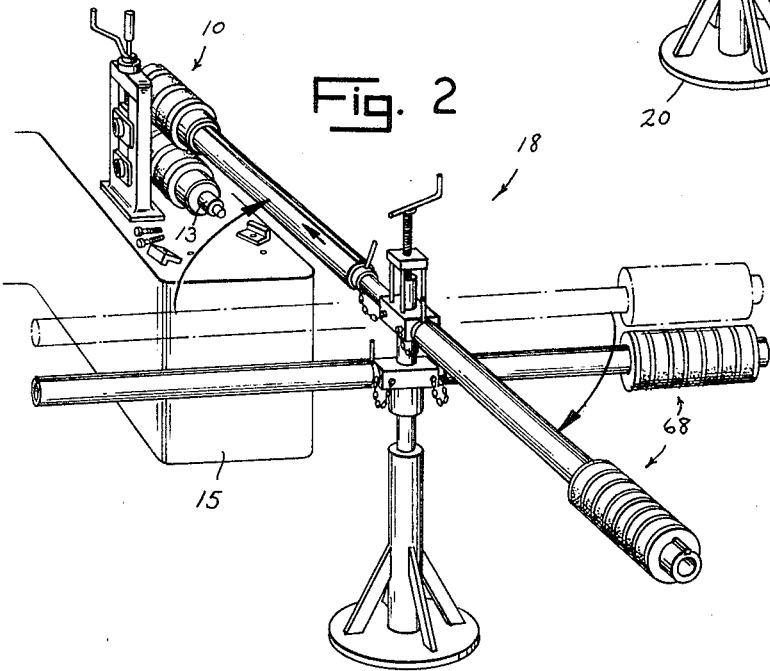
INVENTOR.
LESTER E. SANDER
ATTORNEY

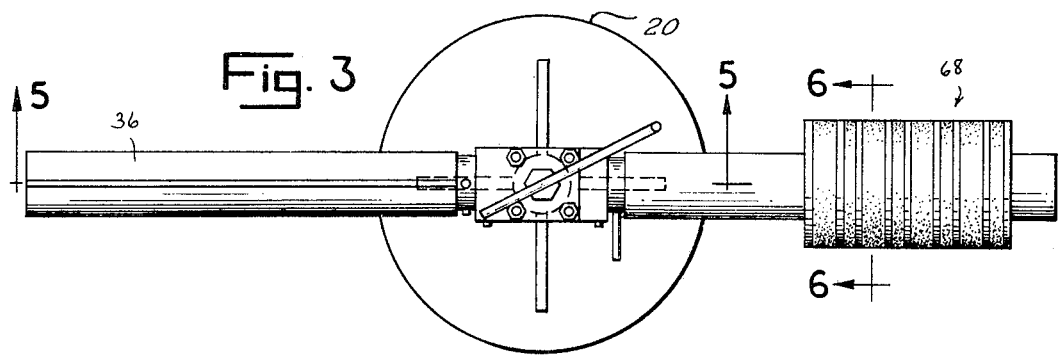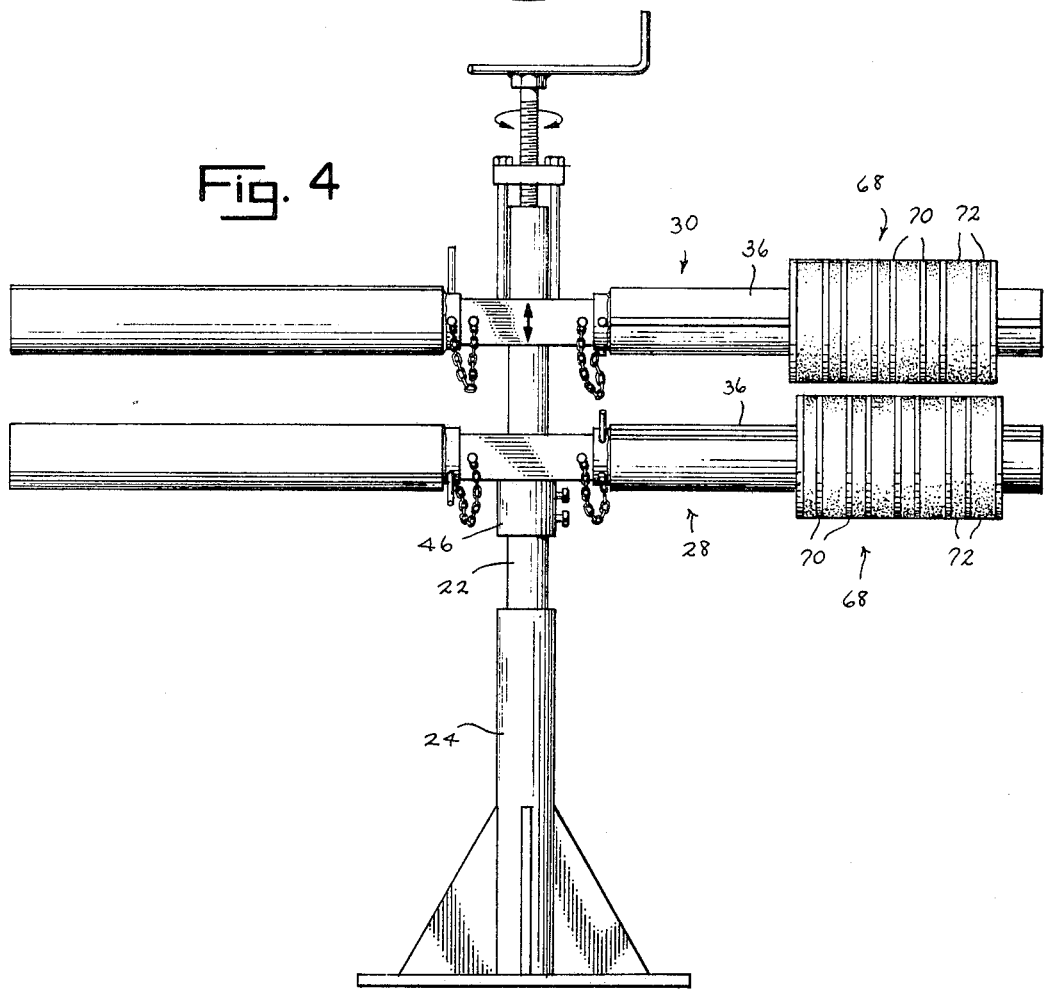

March 31, 1970   L. E. SANDER   3,503,293
SLITTER CUTTING DISK ASSEMBLY TRANSFER DEVICE
Filed March 11, 1968   3 Sheets-Sheet 3
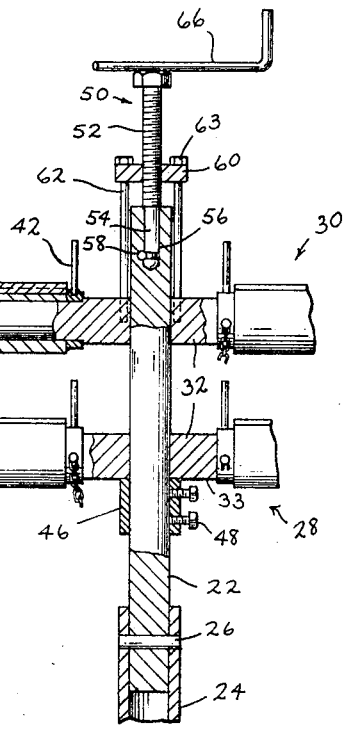
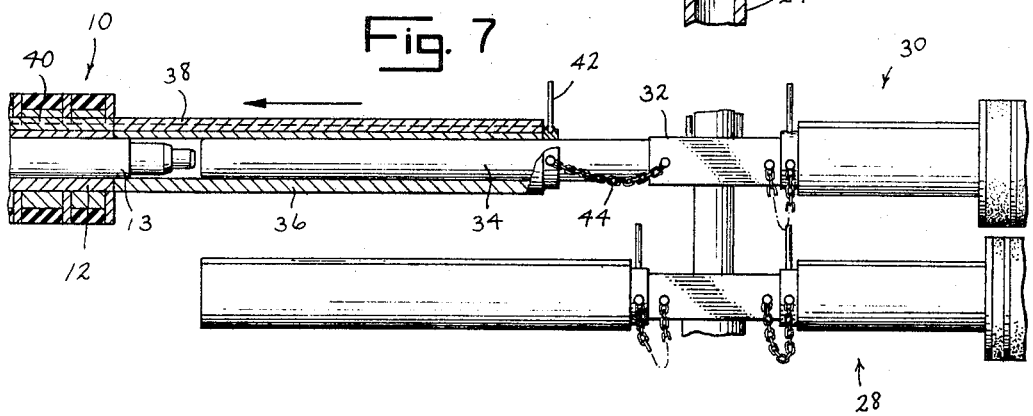
INVENTOR.
LESTER E. SANDER
BY
ATTORNEY United States Patent Office 3,503,293
Patented Mar. 31, 1970

3,503,293
SLITTER CUTTING DISK ASSEMBLY
TRANSFER DEVICE
Lester E. Sander, 3608 Parthenon Way,
Olympia Fields, Ill. 60461
Filed Mar. 11, 1968, Ser. No. 712,082
Int. Cl. B23d 19/00; B26d 1/14
U.S. Cl. 83—481      8 Claims

ABSTRACT OF THE DISCLOSURE

A cutting disk assembly transfer device for use with a slitter and having upper and lower sets of arms spacedly positioned and rotatably mounted upon an upstanding support. Each arm has an outer telescopic part of an outer cross sectional configuration similar to that of an arbor of the slitter, and is adapted to support a cutting disk assembly and to be positioned in alignment with and abutting the end of a slitter arbor for transfer of a cutting disk assembly from the arbor onto an arm and vice versa.

BACKGROUND OF THE INVENTION

Slitters used in cutting a coiled metal strip into ribbons utilize cutting disk assemblies consisting of cutting disks selectvely spaced by spacers and accurately positioned on its arbors. As different fabricators require varying widths of metal ribbons, the cutting disk assemblies must be changed from job order to job order. Up to this time, the changing of the cutter disk assemblies has required manual handling of individual component parts of the cutter disk assembly to insure proper assembly and the absence of chips or other foreign material between disks and spacers which, if present, would affect the accuracy of the slitter. The proper assembly and mounting of the cutting disk assembly is time consuming and exacting with not only the slitting machine being idled during the change of cutter assemblies, but also associated assembly line equipment including coilers, uncoilers and strapping machines being idled.

SUMMARY OF THE INVENTION

This invention consists of a transfer device for the cutting disk assemblies of a slitter and comprises upper and lower sets of horizontal, telescopic arm assemblies selectively positioned and rotatable upon an upstanding support located adjacent the slitter arbors. Each of the outer tubular telescopic parts at the ends of each arm assembly is rotatable and is of substantially the same length. Each outer tubular part of each arm has an outer keyed or plain cross sectional configuration like that of an arbor of the slitter and is adapted to support a cutting disk assembly mounted thereon. Each of the outer tubular arm parts can be rotated, adjusted in elevation, swung bodily on its support and slid lengthwise of its associated telescoped inner part so as to abut an exposed end of an arbor of the slitter. The cutting assembly components mounted upon the arbor can then be slid from said arbor onto said aligned abutting outer tubular arm part. The other arm part of each arm assembly which has a second cutting disk assembly previously mounted thereon is then swung into alignment and slid into end abutment with said arbor and rotated for alignment of its key with the key of the arbor. The second cutting disk assembly is then slid from said last named arm part onto the adjacent arbor.

The transfer device of this invention permits the operator to assemble sets of cutting disks for a job order while an order requiring a different set of disks is being run through the slitter. Upon completion of the first order the operator can quickly and efficiently transfer the cutting disk assemblies from the slitter onto the empty arms of the transfer device, swing the arms around and transfer the preassembled sets of cutting disks from its support arm onto the empty arbors of the slitter. During the time when the slitter is in operation, the arms of the transfer device may be positioned in a longitudinal direction with respect to the slitter thereby permitting ample room between the transfer device and the slitter for the operator and other workmen to move in performance of their duties. After substitution of the sets of cutting disk assemblies, the sets of assemblies which have been removed from the slitter may be removed from the arms of the transfer device, cleaned and stored, or reassembled in a new arrangement in preparation for still another job order. In this manner the cutting disk assemblies of the slitter may be exchanged or substituted for one another with a minimum amount of down time and loss of productive man hours.

Accordingly, it is an object of this invention to provide a device for rapidly and easily transferring a second set of assembled cutter disks for a first set of assembled cutter disks of a slitter.

It is an object of this invention to provide a cutter disk assembly transfer device whose use reduces the amount of down time of the slitter.

Still a further object of this invention is to provide a cutter disk assembly transfer device for a slitter in which cutting disks can be preassembled in selected arrangement during the operation of the slitter and quickly and efficiently substituted in the required arrangement for the cutting disk assembly on the slitter after the preceding operation.

Other objects of this invention will become apparent upon a reading of the invention's description.

BRIEF DESCRIPTION OF THE DRAWINGS

A preferred embodiment of this invention has been chosen for the purposes of illustration and description wherein:

FIG. 1 is a perspective view of a slitter with the transfer device of this invention positioned adjacent thereto.

FIG. 2 is a perspective view of the transfer device of this invention positioned to receive a cutter disk assembly from the slitter.

FIG. 3 is a top plan view of the transfer device.

FIG. 4 is a side elevational view of the transfer device.

FIG. 5 is a fragmentary side elevational view with parts shown in section taken along line 5—5 of FIG. 3.

FIG. 6 is a transverse sectional view of a cutter disk assembly mounted upon an arm of the transfer device and taken along line 6—6 of FIG. 3.

FIG. 7 is a fragmentary side elevational view of the transfer device with parts shown in section and with one arm in projected transfer position adjacent an arbor of the slitter.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use and thereby enable others skilled in the art to best utilize the invention.

The preferred embodiment of this invention is pictorially shown in FIGS. 1 and 2 and has particular application to the changing of the cutting disk assemblies 10 of a slitter 16. Each assembly 10 is mounted upon an upper or lower plain or longitudinally keyed arbor 11 which is journaled to upstanding housings or stanchions 14 mounted upon the supporting frame 15 of the slitter 16. At least one of the housings 14 is removable from the slitter 16. The slitter is of any conventional type having means for driving the arbors, means for feeding sheet stock and strip re-winding means.

Transfer device 18 includes a base 20 on which is vertically positioned a rigid tubular member 24. A vertical rigid shaft 22 is mounted within tubular member 24 and is held in a fixed relationship thereto by intersecting pin 26 as shown in FIG. 5.

Two horizontally disposed sets of arms 28 and 30 are journaled about vertical support shaft 22. Each arm set 28 and 30 preferably includes a bar whose central section 32 is apertured and journaled about support shaft 22. The end parts 34 of each bar are of similar cylindrical shape and length with their axes intersecting the axis of support shaft 22. The end parts 34 may be integral with the central bar section 32 as shown in FIG. 5, or may be individual shafts attached to central bar section 32 by any convenient means, such as by a threaded union carried by the central section. Each part or shaft 34 is preferably of substantially the same diameter as the reduced end part 13 of each slitter arbor 11.

A cylindrical tubular member 36 is telescopically mounted upon each end part 34, being both axially slidable and rotatable thereon and having an outer diameter equal to the outer diameter of part 12 carried by each slitter arbor 11. When the arbors 11 are keyed, each tubular member 36 has longitudinally mounted therein an exteriorly positioned key 38 whose height and width are substantially equal to the height and width of any key 15 mounted in arbor part 12 which carries a cutting disk assembly 10. A handle member 42 is preferably secured to the inner end of tubular member 36. To preclude release or disconnection of tubular member 36 from part 34 during use of the transfer device 18, a chain member 44 is connected at one end to member 36 and at its other end to central bar section 32.

Individual adjustment means are provided for each set of arms 28 and 30 to vertically position the arms at selected elevations upon support shaft 22. A collar 46 may encircle the lower part of shaft 22 with its upper end engaging and supporting the lower face 33 of central bar section 32 of the lower set of arms 28. Set screws 48 are threaded in collar 46 to engage the shaft 22, thereby holding the set of arms 28 at a predetermined elevation.

A similar support collar can be utilized to support the upper set of arms 30, but in order to permit the arms 28 and 30 to be vertically positioned in close proximity to each other without interference from arm supporting means interposed therebetween, it is preferable to support the upper arms 30 from above in a manner similar to that shown in FIG. 5. A bolt 50 has a threaded upper portion 52 and an unthreaded lower portion 54. Lower bolt portion 54 is journaled within an axial bore 56 in the upper part of shaft 22 and is restrained from axial movement therein by suitable retaining mechanism 58 permitting rotation of the bolt. A plate 60 having a central threaded bore is threaded on the upper portion 52 of turn bolt 50. Bolts 62 are secured to the central bar section 32, as by threaded engagement in bores in said central section 32, and extend thereabove and through apertures in plate 60 on which bolt heads 63 bear. Attached to the upper end of turn bolt 50 is a handle member 66. The elevation of the upper set of arms 30 may be adjusted by turning handle member 66 which raises or lowers the plate 60 upon bolt 50, carrying with it the upper set of arms 30.

The transfer device 18 is positioned or installed adjacent to the slitter 16 proximate the removable arbor stanchion 14. The axis of support shaft 22 is positioned within the same vertical plane in which lie the axes of both arbors 11 of the slitter 16. The transfer device 18 is installed laterally spaced from slitter 16 as shown in FIG. 2, so that the free end of each end part 34 and of tubular member 36 when in a retracted position and aligned with a slitter arbor 11 will have end clearance with said slitter arbor. The sets of arms 28 and 30 are vertically positioned so that each is at the same elevation as a slitter arbor 11, and each tubular member 36 can be projected outwardly to fit telescopically over an arbor end part 13 with its end abutting the part 12 of the arbor.

To operate the transfer device 18 after it has been installed as described above, complementary cutting disk assemblies 68, each consisting of cutting disks 70, spacers, and yieldable disks 72 are mounted upon a tubular member 36 of each set of arms 28 and 30 in the relation required for a predetermined slitting operation. When a run of the slitter has been completed and it is desired to change to another cutter setup, the slitter is shut down, the slitter arbors are separated to a clearance position and the stanchion 14 adjacent to the transfer device 18 is removed, thereby exposing ends 13 of arbors 11. The tubular members 36 of the transfer device which have no premounted cutters supported thereon are then swung into positions in axial alignment with the slitter arbors 11. Handle members 42 are then grasped by the operator and the aligned tubular members 36 are extended until they telescope over the exposed reduced shafts 13 of the aligned arbors 11 and abut arbor parts 12. If the arbor is keyed, each tubular member 36 is then rotated until the key 38 mounted thereon is aligned with the key 40 of the aligned arbor 11. The cutting disk assembly 10 on each arbor part 12 is then slid onto the aligned abutting tubular member 36.

Once all parts of the cutting disk assembly 10 have been transferred onto the tubular member 36, said member is withdrawn from telescoping engagement with arbor part 13 into a retracted position upon its supporting part 34. After both cutting disk assemblies 10 have been removed from the slitter arbors 11 and the tubular members 36 retracted, the sets of arms 28 and 30 are swung to align with the slitter arbors the tubular members 36 of the sets of arms which have the premounted cutting disk assemblies 68 supported thereon. Each of these latter tubular members 36 is then projected to fit telescopically around an arbor part 13 and abut the aligned arbor part 12. Any key 38 of the latter tubular members 36 then are aligned with keys 40 of the slitter arbors as previously described. Each cutting disk assembly 68 is then slid from a tubular member 36 onto the aligned abutting arbor part 12. The tubular members 36 are then retracted and the sets of arms 28 and 30 swung to a clearance position with respect to the slitter as shown in FIG. 1, permitting operators or workmen to replace stanchion 14 and set the spacing of arbors 11 in preparation for new slitter operation.

It will be understood that the invention is not to be limited to the details herein given but may be modified within the scope of the appended claims. One such modification is to position the arm end parts 34 to extend at some angle to each other rather than being aligned as here shown.

What I claim is:

1. In combination, a slitter for sheet stock including upper and lower arbors each having a reduced end portion, complementary cutting disk assemblies mounted upon said arbors, a stanchion journaling the end portions of said arbors, said stanchion being removable to expose the reduced end of each of said arbors and accommodate release of said cutting disk assemblies, and a transfer device including an upstanding support positioned spacedly from said slitter and adjacent the removable arbor stanchion, upper and lower sets of arm assemblies journaled to and horizontally rotatable about said support, each set of arm assemblies having at least two telescopic arms lying in the same horizontal plane and having inner and outer parts, each set of arm assemblies being rotatable to selectively align one of said telescopic arms with one of said arbors when said arm is retracted, the outer part of each telescopic arm being rotatable about the inner part of the arm and extensible endwise to surround the reduced end portion of an aligned arbor when said stanchion is removed, said outer part having substantially the same outer cross sectional configuration and dimension as said arbor to accommodate sliding of said cutting disk assemblies from one to the other of an aligned arbor and outer arm when their configurations register.

2. The combination slitter and transfer device of claim 1 and means for adjusting at least one of said upper and lower arbors to separate said cutting disk assemblies, and means for adjusting at least one of said upper and lower sets of arm assemblies into alignment with an arbor.

3. A cutting disk assembly transfer device for a slitter having upper and lower journaled arbors mounting complementary cutting disk assemblies, comprising:
an upstanding support;
upper and lower sets of arm assemblies journaled to and horizontally rotatable about said support;
each arm assembly having at least two telescopic arms lying in the same horizontal plane and having inner and outer parts, each said assembly being rotatable to selectively align one of said telescopic arms with one of said arbors when said arm is retracted; and
the outer part of each arm being rotatable about the inner part of the arm and extensible endwise to abut an aligned arbor, said outer part having substantially the same outer cross sectional configuration and dimension as said arbor to accommodate sliding of said cutting disk assemblies from one to the other of an aligned and abutting arbor and outer arm when their configurations register.

4. The cutting disk assembly transfer device of claim 3 for a slitter having arbors of reduced end portions wherein said outer part of each arm is extensible to surround the reduced end portion of an aligned arbor when said arbor end portion is exposed.

5. The cutting disk assembly transfer device of claim 3, and means for adjusting the elevations of said upper and lower sets of arm assemblies.

6. The cutting disk assembly transfer device of claim 3, including a flexible member connected to the outer and inner parts of each arm for restricting the extensible movement of the outer part along the inner part.

7. The cutting disk assembly transfer device of claim 5, wherein said upstanding support includes a vertical shaft journaling said upper arm assembly intermediate its ends, said shaft having an axial bore at its upper end, a member rotatably supported within said bore and having an upward projecting exposed threaded portion, an arm suspending member having a threaded aperture therein receiving the threaded portion of said rotatable member and depending parts connected to said arm assembly, and means for rotating said rotatable member to advance said arm suspending member along said rotatable member and adjust the elevation of said arm assembly.

8. The cutting disk assembly transfer device of claim 3, wherein each arm assembly has two axially aligned telescopic arms.

References Cited

UNITED STATES PATENTS

| | | | |
|---|---|---|---|
| 1,959,424 | 5/1934 | Hawkins | 83—479 X |
| 2,318,731 | 5/1943 | Wood | 83—481 |
| 2,901,927 | 9/1959 | Morgan. | |

JAMES M. MEISTER, Primary Examiner

U.S. Cl. X.R.

83—564; 214—1